INVENTORS
Edwin L. Harder &
Herbert S. Kirschbaum

Patented Feb. 21, 1950

2,498,268

UNITED STATES PATENT OFFICE 2,498,268

REGULATING SYSTEM

Edwin L. Harder, Pittsburgh, Pa., and Herbert S. Kirschbaum, Columbus, Ohio, assignors to Westinghouse Electric Corporation, East Pittsburgh, Pa., a corporation of Pennsylvania Application April 15, 1949, Serial No. 87,724

7 Claims. (Cl. 322—25)

1

This invention relates to regulating systems.

Regulating systems which utilize exciters for controlling the excitation of generators have been known for years. Recently, a self-excited or "series tuned" exciter which normally operates along the linear part of its saturation curve has been utilized in such regulating systems. Such exciters have a series field winding and a shunt field winding for cooperating to normally supply the excitation requirements of the machine and a control field winding disposed to be directionally energized in response to the operation of a generator, the excitation of which is controlled by the exciter.

In such systems, the changes in load supplied by the generator effects changes in the temperature of the generator field winding with the result that the resistance of the armature circuit of the exciter which includes the generator field winding, changes and the self-excited exciter becomes either "under-tuned" or "over-tuned."

In Patent No. 2,448,442, issued August 31, 1948 to H. S. Kirschbaum, there is disclosed and claimed a system of the class described hereinbefore and in which provision is made for effecting temperature compensation by effecting changes in the energization of the shunt field winding as the temperature of the generator field windings varies. This system is effective but requires large units of intelligence as the compensation is effected in the shunt field winding. Further, it necessitates the use of a shunt field winding which greatly enlarges the size of the exciter.

One object of this invention is to provide in a regulating system which utilizes a self-excited exciter provided with a control field winding for controlling the excitation of a generator, for supplying an intelligence to the control field winding of the exciter for effecting temperature compensation for the exciter to maintain it "tuned" as the generator field temperature varies.

Another object of this invention is to provide in a regulating system which utilizes a self-excited exciter provided with a control field winding for controlling the excitation of a generator, a resistor means disposed to be responsive to temperature changes of the generator field winding and connected in circuit with the control field winding for modifying the excitation of the exciter to maintain it "tuned" as the generator field temperature varies.

A more specific object of this invention is to provide a resistor means responsive to tempera-

2 ture changes of a generator field winding for modifying the excitation of a self-excited exciter having a series field winding and a control field winding in accordance with such temperature changes, the resistor means being adjustable in the control field winding circuit to change the energization thereof whereby the control field winding cooperates with the series field winding of the exciter to determine the "tuning" of the exciter.

Other objects of this invention will become apparent from the following description when taken in conjunction with the accompanying drawing, in which.

Figure 1:
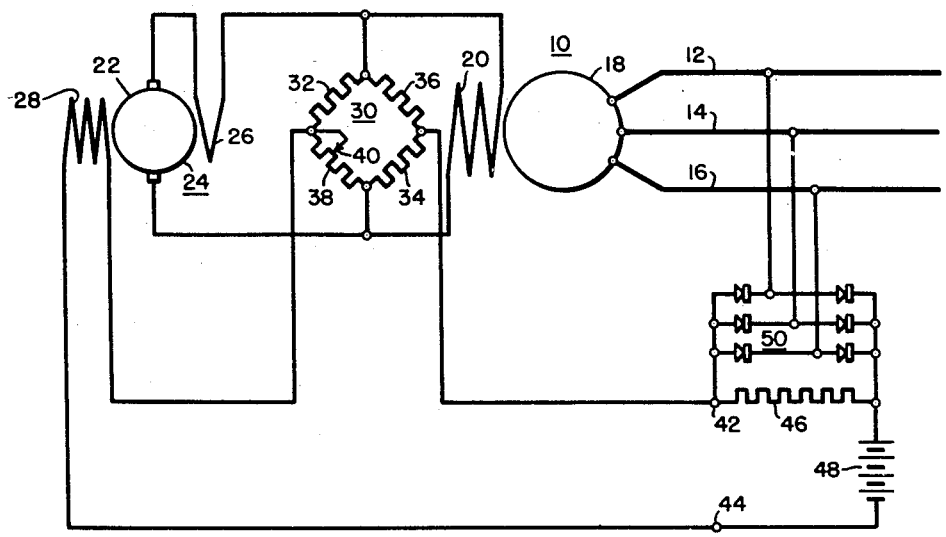
Figure 1 is a diagrammatic representation of a regulating system embodying the teachings of this invention.

Referring to the drawing there is illustrated in Fig. 1, a generator 10 shown as connected to supply a three-phase load circuit represented by conductors 12, 14 and 16. The generator 10 comprises the armature windings 18 and the field windings 20, the field windings 20 being connected across the armature windings 22 of a self-excited exciter 24 which is provided with a series field winding 26.

The self-excited exciter 24 is so designed that at a given normal operating temperature the series field winding 26 is sufficient for normally providing the entire excitation of exciter 24 when the generator 10 is operating to maintain normal line voltage across the load conductors 12, 14 and 16. In addition to the self-exciting series field winding 26, the exciter 24 is provided with a control field winding 28 which, as explained more fully hereinafter, functions to control the excitation of the exciter 24 in response to a deviation of the line voltage, to tune the exciter 24, and to provide for varying the excitation as the resistance of the armature circuit of the exciter changes with variations in the temperature of the generator field windings 20.

In this embodiment, the input terminals of a resistor bridge 30 are connected across the armature windings 22 of the exciter 24 and the output terminals are disposed to be connected in circuit with the control field winding 28. The resistor bridge 30 is composed of four resistor elements 32, 34, 36, and 38, the resistors 32 and 34 being of a material having zero temperature coefficient of resistance and the resistors 36 and 38 being formed of a material such as nickel and having a high temperature coefficient of resistance. Preferably, the bridge 30 is positioned adjacent the generator 10 where the ambient temperature with respect to the bridge 30 increases with an increase in load supplied by the generator 10. Thus the resistor bridge 30 may be positioned adjacent the frame of the alternating current generator 10 or in the flow of air entering the generator. An adjustable tap 40 is also provided on the resistor element 38 to aid in tuning the exciter 24 as will be referred to hereinafter.

The control field winding 28 of the exciter 24 is disposed to be normally deenergized when the generator 10 is operating to maintain normal regulated line voltage and is directionally energized as the line voltage departs from normal to so excite the exciter 24 as to correct the excitation of the generator 10 to correct for such departure and maintain the line voltage substantially at its normal value. For this purpose, one terminal of the control field winding 28 is connected through the output terminals of the resistor bridge 30 to a terminal 42 of a voltage measuring circuit, the other terminal of the control field winding 28 being connected to a terminal 44 of the voltage measuring circuit.

In this instance, the voltage appearing across terminals 42 and 44 constitutes a measure of the departure of the line voltage across conductors 12, 14 and 16 and is determined by the differential of the opposed potentials appearing across a resistor 46 and a battery 48 which are connected in series circuit relation with respect to each other. The potential across resistor 46 is impressed thereon from a full wave rectifier 50, the input terminals of which are connected to the load conductors 12, 14 and 16 whereby the potential across the resistor 46 is a measure of the line voltage. Since the potentials of resistor 46 and battery 48 are opposed but equal for a given line voltage, it is apparent that the differential of such potentials as measured across terminals 42 and 44 is a measure of the departure of the line voltage from the given line voltage which is required to be maintained substantially constant, the polarity of the differential voltage depending upon the direction of the departure of the line voltage.

In operation, assuming that the generator 10 and the series tuned exciter 24 are being driven by some suitable means (not shown) for supplying power at a constant voltage to a load (not shown), the series field winding 26 is sufficient for normally maintaining the excitation of the generator 10 to maintain substantially constant voltage across the line conductors 12, 14 and 16. The battery 48 and the resistor 46 are so selected that at the voltage across the line conductors 12, 14 and 16 which is to be maintained substantially constant the potentials across the resistor 46 and battery 48 are equal but opposite and a voltage drop will not appear across the control field winding 28 of the exciter 24.

Where the series field winding 26 is insufficient to effect sufficient initial excitation of the exciter 24, the terminal or tap 40 of the resistor bridge 30 may be adjusted to create a slight unbalance of the bridge resistance whereby current will flow in the control field winding 28 in a direction to tend to increase the excitation of the exciter 24 to a required value. In such cases the initial tuning of the exciter 24 is dependent upon the cooperative effect of the series field winding 26 and the control field winding 28 and any change in the energization of the control field winding 28 by reason of temperature variation or departure of the line voltage from the given value will be added to or in opposition to such initial energization of the control field winding 28 as a result of the initial tuning of the exciter 24.

Under such conditions of operation, the armature circuit of the exciter 24 which includes the series field winding 26 of the exciter 24 and the field winding 20 of the generator 10 has a definite resistance as the machines are operating at a normal operating temperature. In such instances, and in the embodiment shown, the series field winding 26 is usually sufficient to so maintain the excitation of the exciter 24 that it is tuned to operate along the linear part of its saturation curve. Where the bridge 30 is balanced at the normal operating temperature of the machine 10 there is no energy in the field winding 28. However, if energy in addition or in opposition to that of the series field winding 26 is needed to effect the tuning of the exciter 24, then the tap 40 is adjusted as described hereinbefore to effect the required energization of the control field winding 28 for cooperating with the series field winding 26 to effect the tuning of the exciter 24. For the purpose of simplifying the explanation of the operation of the system, it may be considered that the series field winding 26 is sufficient to maintain the excitation of the exciter 24 tuned as described and that the resistor bridge 30 is balanced at the normal operating temperature.

If the load supplied by conductors 12, 14 and 16 should increase with a resulting decrease in the line voltage from the predetermined value, then the current flow in the field winding 20 of the generator 10 tends to increase thereby tending to heat the field winding and increase its resistance. Without the presence of means for effecting temperature compensation, it is therefore apparent that the exciter 24 is then undertuned.

The decrease in the line voltage referred to effects a decrease in the potential impressed across the resistor 46 whereby the potential across the battery 48 predominates to give a differential potential across terminals 42 and 44 having a polarity such as to effect the energization of the control field winding 28 in a direction to produce an action to aid the series field winding 26 to increase the output of the exciter 24 to increase the excitation of the generator 10 to return the line voltage to the predetermined value and the differential potential across terminals 42 and 44 to zero.

The resulting increase in the voltage across the generator field winding 20 will effect a slow increase in the temperature of the resistor bridge 30, thereby increasing the resistance of the resistors 36 and 38 but will not change the resistance of the resistors 32 and 34 which have zero temperature coefficients. The unbalance over a period of time in the resistor bridge 30 due to the increase in voltage causes a current to flow from the bridge 30 through the control field winding 28 as to energize the control field winding in a direction to tend to aid the series field winding 26 to maintain the exciter tuned when the line voltage is returned to the predetermined value.

If the load supplied by the conductors 12, 14 and 16 should decrease with a resulting increase in the line voltage from the predetermined value, the current flow in the generator field winding 20 tends to decrease with the result that the temperature of the field windings is decreased with a corresponding decrease in the resistance of the windings 20. Without the presence of means for effecting temperature compensation, the exciter 24 would then be overturned.

As the line voltage increases, the voltage impressed across resistor 46 is increased and predominates with respect to the potential across the battery 48 with the result that the differential potential across terminals 42 and 44 has a polarity such as to effect the energization of the control field winding 28 in a direction to produce an action to oppose the series field winding 26 to decrease the output of the exciter 24 to decrease the excitation of the generator 10 to return the line voltage to the predetermined value and the differential potential across terminals 42 and 44 to zero.

The decrease in the voltage across the field winding 20 will effect a decrease in the temperature of the resistor bridge 30 whereby the temperature of resistors 36 and 38 is decreased to unbalance the bridge. Such unbalance in the resistance of the bridge 30 causes current to flow from the bridge through the control field winding 28 in a direction to tend to oppose the action of the series field winding 26 to maintain the exciter 24 tuned when the line voltage is returned to the predetermined value.

Figure 2:
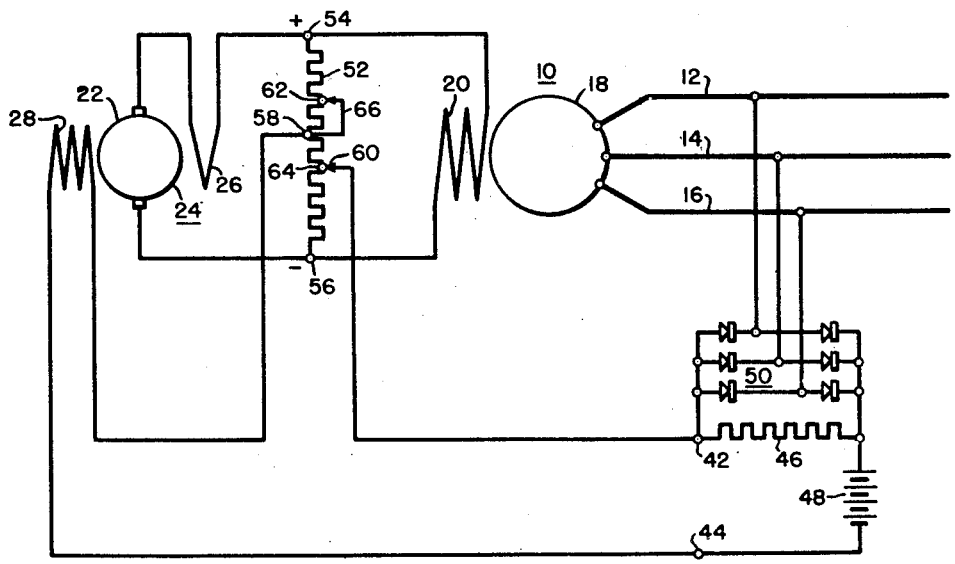
Fig. 2 is a diagrammatic representation of another embodiment of a regulating system embodying the teachings of this invention.

The embodiment illustrated in Fig. 2 is similar to the system of Fig. 1, like numerals being employed on both systems for identifying like elements. In Fig. 2, the system differs from that of Fig. 1 in the resistor means connected across the exciter 24 and in circuit relation with the control field winding 28. In this embodiment the resistor means constitutes a potentiometer resistor 52 connected at terminals 54 and 56 across the exciter 24 and having a fixed tap 58 and an adjustable tap 60 for connecting the section of the resistor 52 therebetween in series circuit relation with the control field winding 28.

In this instance the potentiometer resistor 52 is composed of a central section extending between taps 62 and 64 with the fixed tap 58 therebetween of a resistance material having a positive temperature coefficient, a flexible lead 66 being connected to the fixed tap 58 and disposed to be connected to either the tap 62 or 64 to shunt the section therebetween as will be explained more fully hereinafter. The sections of the resistor between taps 54 and 62 and between taps 64 and 56 are of a resistance material having a zero temperature coefficient.

It will be appreciated that by adjusting the tap 60 in one or the other direction with respect to the fixed tap 58 that the control field winding 28 can be slightly energized in one or the other directions to either aid or oppose the action of the series field winding 26 depending upon whether the exciter 24 is initially over-tuned or under-tuned to thereby insure the operation of the exciter 24 along the linear part of its saturation curve. With the polarities as shown in Fig. 2, if the series field winding 26 is insufficient to supply the tuning of the exciter 24, the tap 60 is adjusted below the fixed tap 58 to provide a voltage drop between the taps 58 and 60 which will have a polarity to effect the energization of the control field winding 28 in a direction to aid the action of the series field winding 26 to tune the exciter 24.

In the example illustrated, the flexible lead 66 engages the tap 62 to shunt the section of the resistor between taps 58 and 62 whereby only the section between taps 58 and 64 will be responsive to temperature changes to compensate the excitation of the exciter 24 to maintain it tuned regardless of changes in resistance in the armature circuit thereof. With the resistor 52 connected as illustrated if the line voltage across conductors 12, 14 and 16 should decrease whereby the potential of the battery 48 predominates across the terminals 42 and 44, such potential is additive to the tuning potential of the section of the resistor between taps 58 and 60 to effect the energization of the control field winding 28 to produce an action to aid the series field winding 26 to increase the excitation of the exciter 24 and consequently increase the excitation of the generator 10 to return the line voltage to the value which is to be maintained constant.

The resulting increase in the voltage across the generator field winding 20 will effect a slow increase in the resistance of the section of the potentiometer resistor connected between taps 58 and 64 with the result that current flows in the control field winding 28 in a direction to tend to aid the series field winding 26 to maintain the exciter 24 tuned when the line voltage is returned to the predetermined value.

On the other hand, if the line voltage across conductors 12, 14 and 16 should increase so that the differential of the voltage across terminals 42 and 44 is of a polarity in opposition to the potential across taps 58 and 60 of the potentiometer resistor 52, then the control field winding 28 is energized in a direction to produce an action to oppose the action of the series field winding 26 to decrease the excitation of the exciter 24 and consequently decrease the excitation of the generator 10 to return the line voltage to the value which is to be maintained. The resulting decrease in the voltage across the generator field winding 20 will effect a slow decrease in the resistance of the section of the potentiometer resistor connected between taps 58 and 64 with the result that the initial tuning current flowing therefrom through the control field winding is reduced so that the control field winding 20 will produce only a sufficient action for cooperating with that of the series field winding 26 to maintain the exciter 24 tuned for operation along the linear part of its saturation curve.

Figure 3:
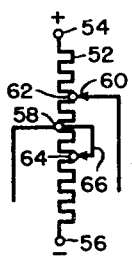
Fig. 3 is a diagrammatic representation of a part of the circuit of Fig. 2 illustrating a different operating condition.

If the exciter 24 is initially overtuned, then, as shown in Fig. 3, the flexible lead 66 is adjusted to contact tap 64 to shunt the section of resistor between the taps 58 and 64 and the adjustable tap 60 is moved to the other side of fixed tap 58 so as to include the section of resistor between taps 58 and 62 in series circuit relation with the control field winding 28. With such connections the polarity of the potential drop across the section connected between taps 58 and 60 is such as to effect a current flow in the control field winding to produce an action in opposition to that of the series field winding 26 to initially tune the exciter 24.

If the line voltage across conductors 12, 14 and 16 should decrease whereby the differential potential appearing across terminals 42 and 44 is of a polarity opposite to that of the tuning potential across terminals 58 and 60, an energization of the control field winding 28 is effected to produce an action to aid the series field winding 26 to increase the excitation of the exciter 24 and increase the excitation of the generator 10 to return the line voltage to the value to be maintained.

As in the previous example, the resulting increase in the voltage across the generator field winding 20 will effect a slow increase in the resistance of the section of the potentiometer resistor connected between taps 58 and 62 with the result that the current flowing in the control field winding 28 by reason of such connection will be increased to produce an action to aid the series field winding 26 to maintain the exciter 24 tuned when the line voltage is returned to the predetermined value.

With the potentiometer resistor 52 connected as shown in Fig. 3, if the line voltage should increase so that the differential potential across terminals 42 and 44 is of the same polarity as that of the tuning polarity across terminals or taps 58 and 60 of the resistor 52, then an energization of the control field winding 28 is effected to produce an action in opposition to that of the series field winding 26 to decrease the excitation of the exciter 24 and consequently decrease the excitation of the generator 10 to return the line voltage to the value to be maintained. In this instance the resulting decrease in the voltage across the generator field winding 20 effects a slow decrease in the resistance of the section of the resistor connected between taps 58 and 62 with the result that the current flowing in the control field winding 28 by reason of such connection will be decreased to decrease the action in opposition to the action of the series field winding 26, whereby the exciter 24 is maintained tuned when the line voltage is returned to the predetermined value which is to be maintained.

When the system of this invention is employed, it is apparent that the size of the self-excited exciter may be a minimum as a single control field winding which constitutes a low burden is utilized for a three-fold purpose, namely, initial tuning, control in response to deviations of line voltage, and temperature compensation. The change in resistance of the armature circuit of the exciter is directly reflected in the energization of the control field winding so that the exciter is maintained tuned for all such changes.

We claim as our invention:

1. In a regulating system for an alternating current generator provided with a field winding, in combination, a regulating exciter, the regulating exciter having an armature connected in circuit with the generator field winding for supplying the excitation thereof, a series field winding for the exciter for normally supplying the excitation of the exciter, said armature circuit having a variable resistance, a control field winding for the exciter disposed to be energized in accordance with a departure of the generator voltage from a predetermined value, a resistor means connected across the exciter disposed to have a resistance variable in accordance with the variable resistance of the exciter armature circuit, said resistor means also being connected in circuit relation with the control field winding for modifying the energization thereof to maintain normal excitation of the exciter under the variable resistance conditions of the exciter armature circuit.

2. In a regulating system for an alternating current generator provided with a field winding, in combination, a regulating exciter, the regulating exciter having an armature connected in circuit with the generator field winding for supplying the excitation thereof, a series field winding for the exciter for normally supplying the excitation of the exciter, said armature circuit having a variable resistance, a control field winding for the exciter disposed to be energized in accordance with a departure of the generator voltage from a predetermined value, a resistor means connected across the exciter disposed to have a resistance variable in accordance with the variable resistance of the exciter armature circuit, said resistor means also being connected in circuit relation with the control field winding for modifying the energization thereof to maintain normal excitation of the exciter under the variable resistance conditions of the exciter armature circuit, and means for adjusting a section of the resistor means for changing the resistance of the resistor means in circuit with the control field winding to energize the control field winding to cooperate with the series field winding to maintain the normal excitation of the exciter.

3. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor means connected across the exciter and disposed to be responsive to temperature changes of the generator field winding to effect a change in the resistance of the resistor means, said resistor means also being connected in circuit relation with the control field winding for modifying the energization thereof to maintain normal excitation of the exciter under changing temperature conditions of the generator field winding.

4. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor bridge circuit connected across the exciter and disposed to be responsive to temperature changes of the generator field winding to effect a change in the resistance of the bridge circuit, said resistor bridge circuit also being connected in circuit relation with the control field winding for modifying the energization thereof to maintain normal excitation of the exciter under changing temperature conditions of the generator field winding.

5. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a potentiometer resistor connected across the exciter and disposed to be responsive to temperature changes of the generator field winding to effect a change in the resistance of the bridge circuit, and a section of the potentiometer resistor connected in series circuit relation with the control field winding for modifying the energization thereof to change the excitation of the exciter in response to changing temperature conditions of the generator field winding.

6. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor means connected across the exciter and disposed to be responsive to temperature changes of the generator field winding to effect a change in the resistance of the resistor means, said resistor means also being connected in circuit relation with the control field winding for modifying the energization thereof to maintain normal excitation of the exciter under changing temperature conditions of the generator field winding, and means associated with the resistor means and disposed to be adjusted for changing the resistance of the resistance means to thereby modify the energization of the control field winding to cooperate with the series field winding to maintain the normal excitation of the exciter.

7. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor bridge circuit connected across the exciter and disposed to be responsive to temperature changes of the generator field winding to effect a change in the resistance of the bridge circuit, said resistor bridge circuit also being connected in circuit relation with the control field winding for modifying the energization thereof to maintain normal excitation of the exciter under changing temperature conditions of the generator field winding, and means disposed for movement to change the resistance of the bridge circuit to modify the energization of the control field winding whereby the control field winding cooperates with the series field winding to provide and maintain the normal excitation of the exciter.

EDWIN L. HARDER.
HERBERT S. KIRSCHBAUM.

No references cited.